US012584423B2

(12) United States Patent
Shimohara

(10) Patent No.: US 12,584,423 B2
(45) Date of Patent: Mar. 24, 2026

(54) TURBINE AND TURBOCHARGER

(71) Applicant: IHI Corporation, Tokyo (JP)

(72) Inventor: Naoto Shimohara, Tokyo (JP)

(73) Assignee: IHI Corporation, Tokyo (JP)

( * ) Notice: Subject to any disclaimer, the term of this patent is extended or adjusted under 35 U.S.C. 154(b) by 0 days.

(21) Appl. No.: 19/079,957

(22) Filed: Mar. 14, 2025

(65) Prior Publication Data

US 2025/0207515 A1 Jun. 26, 2025

Related U.S. Application Data

(63) Continuation of application No. PCT/JP2022/042410, filed on Nov. 15, 2022.

(51) Int. Cl.
*F01D 25/30* (2006.01)

(52) U.S. Cl.
CPC .......... *F01D 25/30* (2013.01); *F05D 2220/40* (2013.01)

(58) Field of Classification Search
CPC .......... F01D 25/30; F01D 9/026; F01D 25/24; F05D 2220/40; F02B 39/00
See application file for complete search history.

(56) References Cited

U.S. PATENT DOCUMENTS

2014/0294577 A1* 10/2014 Yoshida ................ F04D 29/403 415/204
2017/0022830 A1* 1/2017 Hughes ................... F01D 25/24
2024/0200456 A1* 6/2024 Kanzaki .................. F01D 25/24
2025/0198304 A1* 6/2025 Sakuma .................. F01D 25/14

FOREIGN PATENT DOCUMENTS

CN 118564334 A * 8/2024 ........... F04D 29/441
DE 102019005182 A1 * 1/2021 ............. F01D 9/026
JP 1-66433 U 4/1989
(Continued)

OTHER PUBLICATIONS

International Search Report issued Jan. 31, 2023 in PCT/JP2022/042410 filed on Nov. 15, 2022, 3 pages.

*Primary Examiner* — Aaron R Eastman
(74) *Attorney, Agent, or Firm* — Oblon, McClelland, Maier & Neustadt, L.L.P.

(57) ABSTRACT

Provided is a turbine including: a first turbine scroll flow passage that extends around a turbine impeller on a radially outer side, and communicates with an accommodating portion; a second turbine scroll flow passage that extends around the turbine impeller on the radially outer side, communicates with the accommodating portion, and is arranged on a discharge flow passage side with respect to the first turbine scroll flow passage; a partition plate configured to divide the first turbine scroll flow passage and the second turbine scroll flow passage in the axial direction; a first tongue portion that is provided at a position facing a downstream end of the first turbine scroll flow passage; and a second tongue portion that is provided at a position facing a downstream end of the second turbine scroll flow passage, a radial distance between an end portion of the second tongue portion on the partition plate side and the turbine impeller being different from a radial distance between an end portion of the first tongue portion on the partition plate side and the turbine impeller.

14 Claims, 6 Drawing Sheets

(56) References Cited

FOREIGN PATENT DOCUMENTS

| | | | |
|---|---|---|---|
| JP | 4-214926 | A | 8/1992 |
| JP | 2002-194525 | A | 7/2002 |
| JP | 2006-348894 | A | 12/2006 |
| JP | 2013-142324 | A | 7/2013 |
| JP | 2022-45099 | A | 3/2022 |
| WO | WO 2013/105316 | A1 | 7/2013 |
| WO | WO 2022/148993 | A1 | 7/2022 |

* cited by examiner

TURBINE AND TURBOCHARGER

CROSS REFERENCE TO RELATED APPLICATIONS

This application is a continuation application of International Application No. PCT/JP2022/042410, filed on Nov. 15, 2022, the entire contents of which are incorporated by reference herein.

BACKGROUND ART

Technical Field

The present disclosure relates to a turbine and a turbocharger.

Related Art

For example, as disclosed in Patent Literature 1, as a turbine provided in a turbocharger or the like, there is a turbine in which two turbine scroll flow passages extending around a turbine impeller on a radially outer side are arranged side by side in an axial direction of the turbine impeller. A tongue portion is provided at a position facing a downstream end of each of the turbine scroll flow passages. The turbine as described above is also called a twin scroll type turbine.

CITATION LIST

Patent Literature

Patent Literature 1: JP 2006-348894 A

SUMMARY

Technical Problem

In a turbine provided with a tongue portion, such as a twin scroll type turbine, as a distance between the tongue portion and a turbine impeller becomes shorter, aerodynamic performance becomes higher. Meanwhile, as the distance between the tongue portion and the turbine impeller becomes shorter, an excitation force acting on the turbine impeller becomes larger, with the result that blade vibration becomes more liable to occur. Accordingly, it is desired that the blade vibration of the turbine impeller be reduced for improvement in aerodynamic performance.

The present disclosure has an object to provide a turbine capable of reducing blade vibration of a turbine impeller, and a turbocharger.

Solution to Problem

In order to solve the above-mentioned problem, according to the present disclosure, there is provided a turbine, including: an accommodating portion configured to accommodate a turbine impeller; a discharge flow passage that is continuous with the accommodating portion in an axial direction of the turbine impeller; a first turbine scroll flow passage that extends around the turbine impeller on a radially outer side, and communicates with the accommodating portion; a second turbine scroll flow passage that extends around the turbine impeller on the radially outer side, communicates with the accommodating portion, and is arranged on the discharge flow passage side with respect to the first turbine scroll flow passage; a partition plate configured to divide the first turbine scroll flow passage and the second turbine scroll flow passage in the axial direction; a first tongue portion that is provided at a position facing a downstream end of the first turbine scroll flow passage; and a second tongue portion that is provided at a position facing a downstream end of the second turbine scroll flow passage, a radial distance between an end portion of the second tongue portion on the partition plate side and the turbine impeller being different from a radial distance between an end portion of the first tongue portion on the partition plate side and the turbine impeller.

The radial distance between the end portion of the second tongue portion on the partition plate side and the turbine impeller may be longer than the radial distance between the end portion of the first tongue portion on the partition plate side and the turbine impeller.

An average value of a radial distance between the second tongue portion and the turbine impeller in the axial direction may be larger than an average value of a radial distance between the first tongue portion and the turbine impeller in the axial direction.

a radial distance between at least one of the first tongue portion or the second tongue portion and the turbine impeller may become longer as extending toward the discharge flow passage side in the axial direction.

a radial distance between at least one of the first tongue portion or the second tongue portion and the turbine impeller may become longer as extending in a rotation direction of the turbine impeller.

In order to solve the above-mentioned problem, according to the present disclosure, there is provided a turbocharger including the above-mentioned turbine.

Effects

According to the present disclosure, it is possible to reduce blade vibration of the turbine impeller.

DESCRIPTION OF EMBODIMENTS

Figure 1:
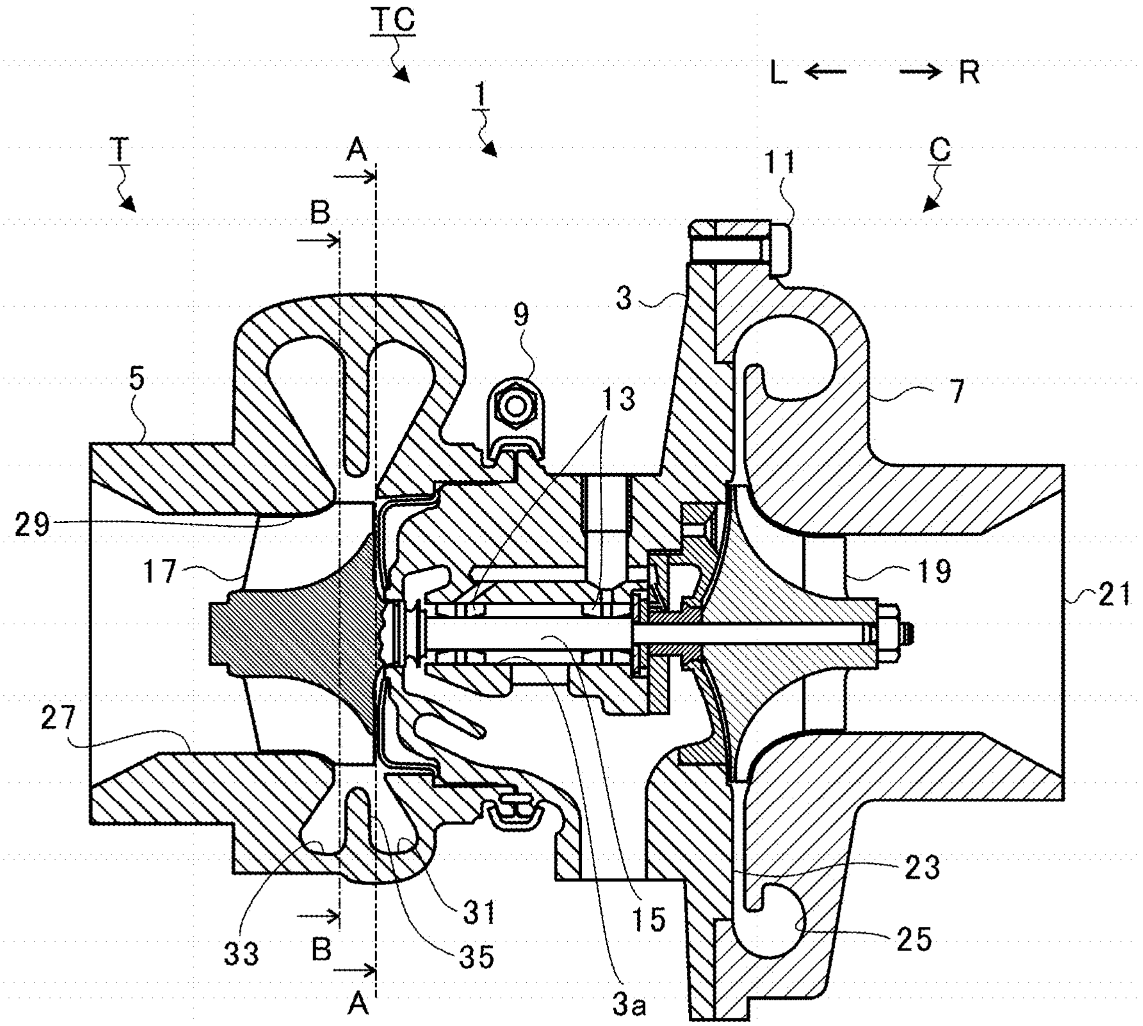
FIG. 1 is a schematic sectional view for illustrating a turbocharger according to an embodiment of the present disclosure.

Now, with reference to the attached drawings, an embodiment of the present disclosure is described. The dimensions, materials, and other specific numerical values represented in the embodiment are merely examples used for facilitating the understanding of the disclosure, and do not limit the present disclosure unless otherwise particularly noted. Elements having substantially the same functions and configurations herein and in the drawings are denoted by the same reference symbols to omit redundant description thereof. Further, illustration of elements with no direct relationship to the present disclosure is omitted.

FIG. 1 is a schematic sectional view for illustrating a turbocharger TC according to an embodiment of the present disclosure. In the following, description is given while a direction indicated by the arrow L illustrated in FIG. 1 corresponds to a left side of the turbocharger TC. A direction indicated by the arrow R illustrated in FIG. 1 corresponds to a right side of the turbocharger TC. As illustrated in FIG. 1, the turbocharger TC includes a turbocharger main body 1. The turbocharger main body 1 includes a bearing housing 3, a turbine housing 5, and a compressor housing 7.

The turbine housing 5 is coupled to a left side of the bearing housing 3 by a fastening mechanism 9. The fastening mechanism 9 is, for example, a G coupling. The compressor housing 7 is coupled to a right side of the bearing housing 3 by a fastening bolt 11. The turbocharger TC includes a turbine T and a centrifugal compressor C. The turbine T includes the bearing housing 3 and the turbine housing 5. The turbine T is a twin scroll type turbine. The centrifugal compressor C includes the bearing housing 3 and the compressor housing 7.

The bearing housing 3 has a bearing hole 3*a* formed therein. The bearing hole 3*a* passes through the bearing housing 3 in a right-and-left direction of the turbocharger TC. Bearings 13 are provided in the bearing hole 3*a*. In FIG. 1, a full floating bearing is illustrated as an example of the bearing 13. However, the bearing 13 may be other bearing such as a semi-floating bearing or a rolling bearing. The bearings 13 axially support a shaft 15 in a rotatable manner. A turbine impeller 17 is provided at a left end portion of the shaft 15. The turbine impeller 17 is accommodated in the turbine housing 5 so as to be rotatable. A compressor impeller 19 is provided at a right end portion of the shaft 15. The compressor impeller 19 is accommodated in the compressor housing 7 so as to be rotatable.

An axial direction, a radial direction, and a circumferential direction of the turbocharger TC are hereinafter also simply referred to as "axial direction," "radial direction," and "circumferential direction," respectively. The axial direction of the turbocharger TC corresponds to an axial direction of the shaft 15, an axial direction of the turbine impeller 17, and an axial direction of the compressor impeller 19. The radial direction of the turbocharger TC corresponds to a radial direction of the shaft 15, a radial direction of the turbine impeller 17, and a radial direction of the compressor impeller 19. The circumferential direction of the turbocharger TC corresponds to a circumferential direction of the shaft 15, a circumferential direction of the turbine impeller 17, and a circumferential direction of the compressor impeller 19.

An intake port 21 is formed in the compressor housing 7. The intake port 21 is opened on the right side of the turbocharger TC. The intake port 21 is connected to an air cleaner (not shown). A diffuser flow passage 23 is defined by opposed surfaces of the bearing housing 3 and the compressor housing 7. The diffuser flow passage 23 increases pressure of air. The diffuser flow passage 23 has an annular shape. The diffuser flow passage 23 communicates with the intake port 21 on a radially inner side through intermediation of the compressor impeller 19.

Further, a compressor scroll flow passage 25 is formed in the compressor housing 7. The compressor scroll flow passage 25 has an annular shape. The compressor scroll flow passage 25 is located, for example, on a radially outer side with respect to the diffuser flow passage 23. The compressor scroll flow passage 25 communicates with an intake port of an engine (not shown) and the diffuser flow passage 23. When the compressor impeller 19 rotates, the air is sucked from the intake port 21 into the compressor housing 7. The sucked air is pressurized and accelerated in the course of flowing through blades of the compressor impeller 19. The air having been pressurized and accelerated is increased in pressure in the diffuser flow passage 23 and the compressor scroll flow passage 25. The air having been increased in pressure is guided to the intake port of the engine.

A discharge flow passage 27, an accommodating portion 29, a first turbine scroll flow passage 31, and a second turbine scroll flow passage 33 are formed in the turbine housing 5. The discharge flow passage 27 is opened on the left side of the turbocharger TC. The discharge flow passage 27 is connected to an exhaust-gas purification device (not shown). The discharge flow passage 27 communicates with the accommodating portion 29. The discharge flow passage 27 is continuous with the accommodating portion 29 in the axial direction. The accommodating portion 29 accommodates the turbine impeller 17. The first turbine scroll flow passage 31 and the second turbine scroll flow passage 33 are provided on a radially outer side with respect to the accommodating portion 29.

The first turbine scroll flow passage 31 and the second turbine scroll flow passage 33 extend around the turbine impeller 17 on a radially outer side. The first turbine scroll flow passage 31 and the second turbine scroll flow passage 33 communicate with the accommodating portion 29. The second turbine scroll flow passage 33 is arranged on the discharge flow passage 27 side in the axial direction with respect to the first turbine scroll flow passage 31. A partition plate 35 is formed between the first turbine scroll flow passage 31 and the second turbine scroll flow passage 33. The partition plate 35 partitions the first turbine scroll flow passage 31 and the second turbine scroll flow passage 33 in the axial direction. The first turbine scroll flow passage 31 and the second turbine scroll flow passage 33 communicate with an exhaust manifold of the engine (not shown). Exhaust gas exhausted from the exhaust manifold of the engine (not shown) is guided to the discharge flow passage 27 after the exhaust gas is sent to the accommodating portion 29 through the first turbine scroll flow passage 31 and the second turbine scroll flow passage 33. The exhaust gas guided to the discharge flow passage 27 in the course of flowing causes the turbine impeller 17 to rotate.

A rotational force of the turbine impeller 17 is transmitted to the compressor impeller 19 through the shaft 15. When the compressor impeller 19 rotates, the pressure of the air is increased as described above. In such a manner, the air is guided to the intake port of the engine.

Figure 2:
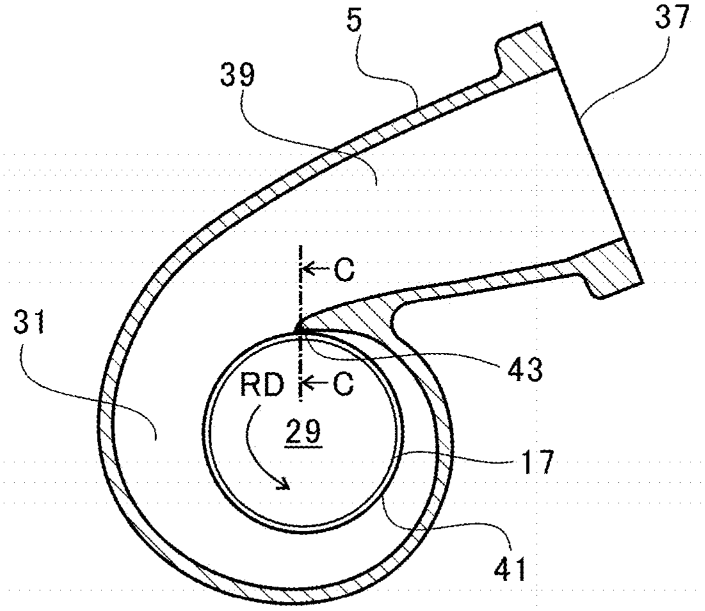
FIG. 2 is a sectional view taken along the line A-A in FIG. 1.

FIG. 2 is a sectional view taken along the line A-A in FIG. 1. The A-A cross section is a cross section that is orthogonal to the axial direction of the shaft 15 and passes through the first turbine scroll flow passage 31. In FIG. 2, the turbine impeller 17 is illustrated such that only an outer periphery thereof indicated by a circle is shown.

As illustrated in FIG. 2, a first exhaust-air introduction port 37 is formed in the turbine housing 5. The first exhaust-air introduction port 37 is open to the outside of the turbine housing 5. The exhaust gas exhausted from the exhaust manifold of the engine (not shown) is introduced into the first exhaust-air introduction port 37.

A first exhaust-air introduction passage 39 is formed between the first exhaust-air introduction port 37 and the first turbine scroll flow passage 31. The first exhaust-air introduction passage 39 connects the first exhaust-air introduction port 37 and the first turbine scroll flow passage 31 to each other. The first exhaust-air introduction passage 39 is formed, for example, into a straight shape. The first exhaust-air introduction passage 39 guides the exhaust gas introduced from the first exhaust-air introduction port 37, to the first turbine scroll flow passage 31.

The first turbine scroll flow passage 31 communicates with the accommodating portion 29 through a first communication portion 41. The first communication portion 41 is formed into an annular shape over the entire periphery of the accommodating portion 29. The first turbine scroll flow passage 31 guides the exhaust gas introduced from the first exhaust-air introduction passage 39, to the accommodating portion 29 through the first communication portion 41. The first turbine scroll flow passage 31 extends around the turbine impeller 17 so as to be closer to the turbine impeller 17 as extending in a rotation direction RD of the turbine impeller 17. A width of the first turbine scroll flow passage 31 in the radial direction decreases from an upstream side toward a downstream side.

A first tongue portion 43 is provided at a position facing a downstream end of the first turbine scroll flow passage 31. The first tongue portion 43 partitions a downstream portion and an upstream portion of the first turbine scroll flow passage 31.

Figure 3:
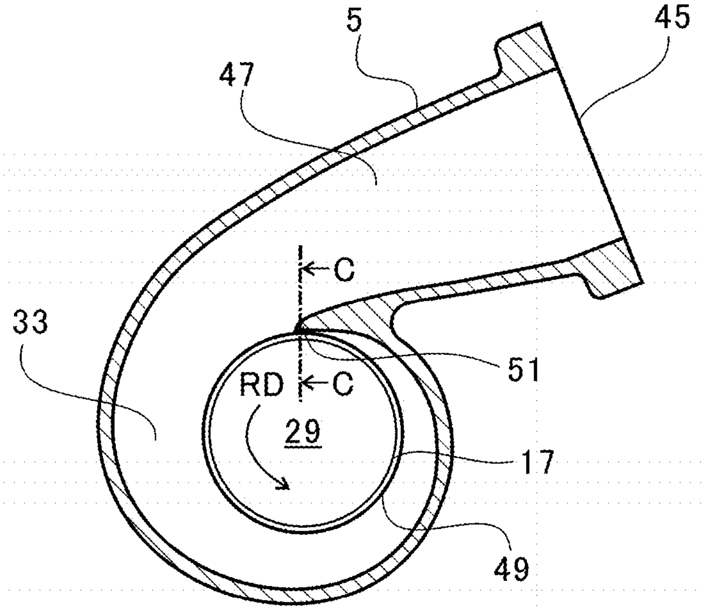
FIG. 3 is a sectional view taken along the line B-B in FIG. 1.

FIG. 3 is a sectional view taken along the line B-B in FIG. 1. The B-B cross section is a cross section that is orthogonal to the axial direction of the shaft 15 and passes through the second turbine scroll flow passage 33. In FIG. 3, similarly to FIG. 2, the turbine impeller 17 is illustrated such that only an outer periphery thereof indicated by a circle is shown.

As illustrated in FIG. 3, a second exhaust-air introduction port 45 is formed in the turbine housing 5. The second exhaust-air introduction port 45 is open to the outside of the turbine housing 5. The second exhaust-air introduction port 45 is arranged on the discharge flow passage 27 side in the axial direction with respect to the first exhaust-air introduction port 37. The first exhaust-air introduction port 37 and the second exhaust-air introduction port 45 are partitioned by the partition plate 35 in the axial direction. The exhaust gas exhausted from the exhaust manifold of the engine (not shown) is introduced into the second exhaust-air introduction port 45.

A second exhaust-air introduction passage 47 is formed between the second exhaust-air introduction port 45 and the second turbine scroll flow passage 33. The second exhaust-air introduction passage 47 connects the second exhaust-air introduction port 45 and the second turbine scroll flow passage 33 to each other. The second exhaust-air introduction passage 47 is formed, for example, into a straight shape. The second exhaust-air introduction passage 47 is arranged on the discharge flow passage 27 side in the axial direction with respect to the first exhaust-air introduction passage 39. The first exhaust-air introduction passage 39 and the second exhaust-air introduction passage 47 are partitioned by the partition plate 35 in the axial direction. The second exhaust-air introduction passage 47 guides the exhaust gas introduced from the second exhaust-air introduction port 45, to the second turbine scroll flow passage 33.

The second turbine scroll flow passage 33 communicates with the accommodating portion 29 through a second communication portion 49. The second communication portion 49 is formed into an annular shape over the entire periphery of the accommodating portion 29. The second communication portion 49 is arranged on the discharge flow passage 27 side in the axial direction with respect to the first communication portion 41. The first communication portion 41 and the second communication portion 49 are partitioned by the partition plate 35 in the axial direction. The second turbine scroll flow passage 33 guides the exhaust gas introduced from the second exhaust-air introduction passage 47, to the accommodating portion 29 through the second communication portion 49. The second turbine scroll flow passage 33 extends around the turbine impeller 17 so as to be closer to the turbine impeller 17 as extending in the rotation direction RD of the turbine impeller 17. A width of the second turbine scroll flow passage 33 in the radial direction decreases from an upstream side toward a downstream side.

A second tongue portion 51 is provided at a position facing a downstream end of the second turbine scroll flow passage 33. The second tongue portion 51 partitions a downstream portion and an upstream portion of the second turbine scroll flow passage 33. A position of the first tongue portion 43 in the circumferential direction and a position of the second tongue portion 51 in the circumferential direction match each other. However, the position of the first tongue portion 43 in the circumferential direction and the position of the second tongue portion 51 in the circumferential direction may be different from each other.

Figure 4:
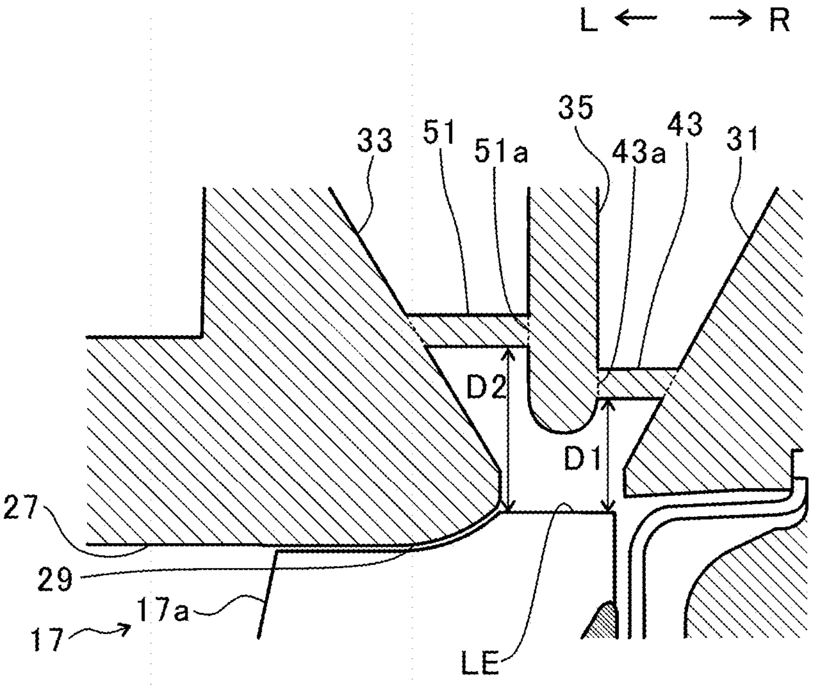
FIG. 4 is a sectional view taken along the line C-C in FIG. 2 and FIG. 3.

FIG. 4 is a sectional view taken along the line C-C in FIG. 2 and FIG. 3. The C-C cross section is a cross section that passes through the first tongue portion 43 and the second tongue portion 51 and includes a rotation axis of the turbine impeller 17.

As illustrated in FIG. 4, the turbine impeller 17 has a plurality of blade bodies 17*a*. The plurality of blade bodies 17*a* are provided at intervals in the circumferential direction. Each of the blade bodies 17*a* is formed so as to extend radially outward from an outer peripheral surface of a hub extending on the rotation axis of the turbine impeller 17. In an example of FIG. 4, a leading edge LE of the blade body 17*a* extends in parallel with the rotation axis of the turbine impeller 17. However, the leading edge LE may be inclined to the radially outer side as extending toward the discharge flow passage 27 side in the axial direction. The leading edge LE is a portion of an outer peripheral edge of the blade body 17*a*, which is opposed to the first turbine scroll flow passage 31 and the second turbine scroll flow passage 33. Exhaust gas flows into the leading edge LE from the first turbine scroll flow passage 31 and the second turbine scroll flow passage 33.

The first tongue portion 43 and the second tongue portion 51 are arranged on a radially outer side with respect to the leading edge LE of the blade body 17*a* of the turbine impeller 17. In the example of FIG. 4, portions of the first tongue portion 43 and the second tongue portion 51 facing the turbine impeller 17 extend in parallel with the rotation axis of the turbine impeller 17. That is, the portions of the first tongue portion 43 and the second tongue portion 51 facing the turbine impeller 17 extend in parallel with the leading edge LE. When the first tongue portion 43 and the second tongue portion 51 are not particularly distinguished from each other, the first tongue portion 43 and the second tongue portion 51 are hereinafter simply referred to as "tongue portion."

A radial distance between the tongue portion and the turbine impeller 17 is a difference between a distance from a center axis of the turbine impeller 17 to the tongue portion and a maximum radius of the turbine impeller 17. That is, the radial distance between the tongue portion and the turbine impeller 17 is a distance between the tongue portion and the leading edge LE at the time when each of the blade bodies 17*a* is closest to each tongue portion. In the example of FIG. 4, for both the first tongue portion 43 and the second tongue portion 51, the radial distance between the tongue portion and the turbine impeller 17 is constant regardless of an axial position. However, for at least one of the first tongue portion 43 or the second tongue portion 51, the radial distance between the tongue portion and the turbine impeller 17 may differ depending on the axial position. FIG. 4 shows a radial distance D1 between the first tongue portion 43 and the turbine impeller 17 and a radial distance D2 between the second tongue portion 51 and the turbine impeller 17.

As illustrated in FIG. 4, a radial distance between an end portion 43*a* of the first tongue portion 43 on the partition plate 35 side and the turbine impeller 17 and a radial distance between an end portion 51*a* of the second tongue portion 51 on the partition plate 35 side and the turbine impeller 17 are different from each other. In the example of FIG. 4, the radial distance between the end portion 51*a* of the second tongue portion 51 on the partition plate 35 side and the turbine impeller 17 is longer than the radial distance between the end portion 43*a* of the first tongue portion 43 on the partition plate 35 side and the turbine impeller 17. Accordingly, the radial distance D2 between the second tongue portion 51 and the turbine impeller 17 is longer than the radial distance D1 between the first tongue portion 43 and the turbine impeller 17. That is, an average value of the radial distance between the second tongue portion 51 and the turbine impeller 17 in the axial direction is larger than an average value of the radial distance between the first tongue portion 43 and the turbine impeller 17 in the axial direction.

Aerodynamic performance becomes higher as the average value of the radial distance between the tongue portion and the turbine impeller 17 in the axial direction becomes smaller. Meanwhile, an excitation force acting on the turbine impeller 17 becomes larger, with the result that blade vibration becomes more liable to occur. In this embodiment, as described above, the radial distance between the end portion 43*a* of the first tongue portion 43 on the partition plate 35 side and the turbine impeller 17 and the radial distance between the end portion 51*a* of the second tongue portion 51 on the partition plate 35 side and the turbine impeller 17 are different from each other. Accordingly, a radial position of the entire first tongue portion 43 and a radial position of the entire second tongue portion 51 can be set individually. Thus, between the first tongue portion 43 and the second tongue portion 51, it can be easy to vary the average values of the radial distances between the tongue portions and the turbine impeller 17 in the axial direction.

Thus, the average value of the radial distance between the tongue portion and the turbine impeller 17 in the axial direction can be reduced for one of the first tongue portion 43 and the second tongue portion 51, while the average value of the radial distance between the tongue portion and the turbine impeller 17 in the axial direction can be increased for another one of the first tongue portion 43 and the second tongue portion 51. Thus, for both the first tongue portion 43 and the second tongue portion 51, the excitation force acting on the turbine impeller 17 can be reduced as compared to a case in which the average value of the radial distance between the tongue portion and the turbine impeller 17 in the axial direction is uniformly reduced or increased. Further, in accordance with the reduction of the excitation force, the radial distance between the tongue portion and the turbine impeller 17 is made smaller, and thus aerodynamic performance can be also improved.

Further, in a case in which the radial distance between the tongue portion and the turbine impeller 17 is short, when the blade body 17*a* of the turbine impeller 17 passes through the vicinity of the tongue portion, an area of a flow passage formed by the blade body 17*a* and the tongue portion is instantaneously narrowed, thereby causing flow contraction of gas. As a result, a circumferential component of the gas flow velocity increases in the vicinity of the tongue portion, and thus a separation vortex becomes more liable to be generated at the leading edge LE. The generation of such a separation vortex acts as a flow blockage inside the flow passage of the turbine impeller 17, and creates a local high-pressure field on the discharge flow passage 27 side of the blade body 17*a*. Such a local high-pressure field is the source of the excitation force. Such a source of the excitation force is a factor that increases the blade vibration. In particular, the vibration becomes more liable to occur on the discharge flow passage 27 side of the leading edge LE, which is more susceptible to the excitation force as compared to a side of the leading edge LE opposite to the discharge flow passage 27 side. Thus, when the gas flow is compressed on the discharge flow passage 27 side of the leading edge LE, the blade vibration particularly becomes more liable to increase.

In this embodiment, as described above, the radial distance between the end portion 51*a* of the second tongue portion 51 on the partition plate 35 side and the turbine impeller 17 is longer than the radial distance between the end portion 43*a* of the first tongue portion 43 on the partition plate 35 side and the turbine impeller 17. Accordingly, the average value of the radial distance between the second tongue portion 51 and the turbine impeller 17 in the axial direction can be made larger than the average value of the radial distance between the first tongue portion 43 and the turbine impeller 17 in the axial direction. This enables enlargement of the area of the flow passage formed instantaneously by the blade body 17*a* and the tongue portion. Thus, a degree to which the gas flow is compressed can be reduced on the discharge flow passage 27 side of the leading edge LE, and hence the increase in blade vibration of the turbine impeller 17 can be appropriately suppressed.

Description has been given above of the example in which the radial distance between the end portion 51*a* of the second tongue portion 51 on the partition plate 35 side and the turbine impeller 17 is longer than the radial distance between the end portion 43*a* of the first tongue portion 43 on the partition plate 35 side and the turbine impeller 17. However, the radial distance between the end portion 51*a* of the second tongue portion 51 on the partition plate 35 side and the turbine impeller 17 may be shorter than the radial distance between the end portion 43*a* of the first tongue portion 43 on the partition plate 35 side and the turbine impeller 17. Further, the average value of the radial distance between the second tongue portion 51 and the turbine impeller 17 in the axial direction may be smaller than the average value of the radial distance between the first tongue portion 43 and the turbine impeller 17 in the axial direction.

Further, description has been given above of the example in which the radial distance between the end portion 51*a* of the second tongue portion 51 and the turbine impeller 17 is longer than the radial distance between the end portion 43*a* of the first tongue portion 43 and the turbine impeller 17, and the average value of the radial distance between the second tongue portion 51 and the turbine impeller 17 in the axial direction is larger than the average value of the radial distance between the first tongue portion 43 and the turbine impeller 17 in the axial direction. However, it may be configured that the radial distance between the end portion 51*a* of the second tongue portion 51 and the turbine impeller 17 is shorter than the radial distance between the end portion 43*a* of the first tongue portion 43 and the turbine impeller 17, and the average value of the radial distance between the second tongue portion 51 and the turbine impeller 17 in the axial direction is larger than the average value of the radial distance between the first tongue portion 43 and the turbine impeller 17 in the axial direction. Further, it may be configured that the radial distance between the end portion 51a of the second tongue portion 51 and the turbine impeller 17 is longer than the radial distance between the end portion 43a of the first tongue portion 43 and the turbine impeller 17, and the average value of the radial distance between the second tongue portion 51 and the turbine impeller 17 in the axial direction is smaller than the average value of the radial distance between the first tongue portion 43 and the turbine impeller 17 in the axial direction.

Figure 5:
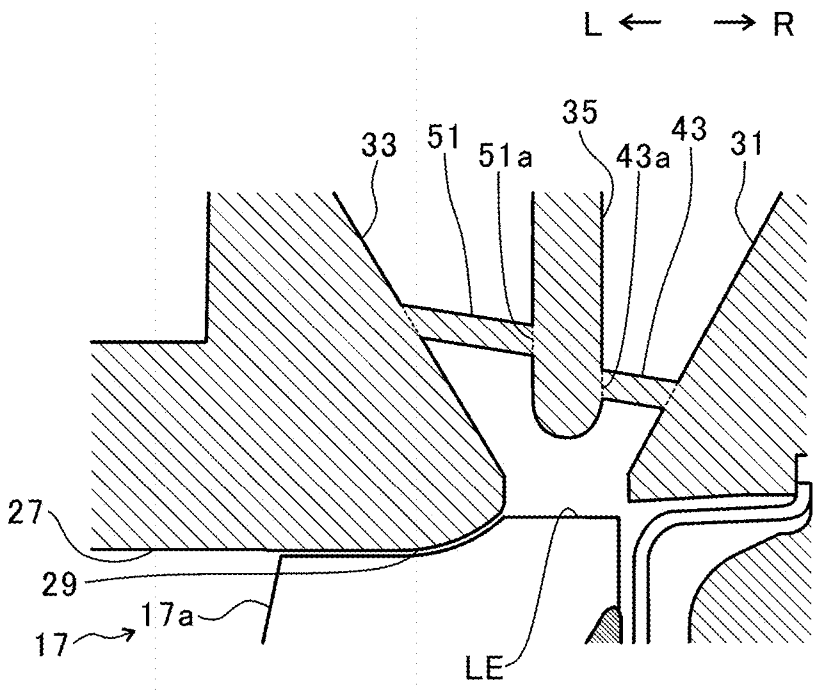
FIG. 5 is a sectional view for illustrating a shape of a tongue portion in a first modification example.

FIG. 5 is a sectional view for illustrating a shape of the tongue portion in a first modification example. FIG. 5 is a sectional view in a cross section that passes through the first tongue portion 43 and the second tongue portion 51 and includes a rotation axis of the turbine impeller 17. In the first modification example, a shape of the first tongue portion 43 and a shape of the second tongue portion 51 are different from those in the embodiment described above with reference to FIG. 1 to FIG. 4.

As illustrated in FIG. 5, in the first modification example, for both the first tongue portion 43 and the second tongue portion 51, the radial distance between the tongue portion and the turbine impeller 17 becomes longer as extending toward the discharge flow passage 27 side in the axial direction. In the example of FIG. 5, the first tongue portion 43 and the second tongue portion 51 are inclined to a radially outer side as extending toward the discharge flow passage 27 side in the axial direction. Portions of the first tongue portion 43 and the second tongue portion 51 facing the turbine impeller 17 are straight when viewed in the circumferential direction. However, the portions of the first tongue portion 43 and the second tongue portion 51 facing the turbine impeller 17 may be curved when viewed in the circumferential direction.

In the first modification example, as described above, for both the first tongue portion 43 and the second tongue portion 51, the radial distance between the tongue portion and the turbine impeller 17 becomes longer as extending toward the discharge flow passage 27 side in the axial direction. Accordingly, it is possible to reduce the degree to which the gas flow is compressed as extending toward the discharge flow passage 27 side in the axial direction at the leading edge LE. Thus, the increase in blade vibration of the turbine impeller 17 can be appropriately suppressed.

Description has been given above of the example in which, for both the first tongue portion 43 and the second tongue portion 51, the radial distance between the tongue portion and the turbine impeller 17 becomes longer as extending toward the discharge flow passage 27 side in the axial direction. However, for only one of the first tongue portion 43 and the second tongue portion 51, the radial distance between the tongue portion and the turbine impeller 17 may become longer as extending toward the discharge flow passage 27 side in the axial direction. When the radial distance between at least one of the first tongue portion 43 or the second tongue portion 51 and the turbine impeller 17 becomes longer as extending toward the discharge flow passage 27 side in the axial direction, the same effect as that in the above-mentioned example is achieved.

The radial distance between at least one of the first tongue portion 43 or the second tongue portion 51 and the turbine impeller 17 may become shorter as extending toward the discharge flow passage 27 side in the axial direction.

In the example of FIG. 5, the radial distance between the end portion 51a of the second tongue portion 51 on the partition plate 35 side and the turbine impeller 17 is longer than the radial distance between the end portion 43a of the first tongue portion 43 on the partition plate 35 side and the turbine impeller 17. However, in the first modification example, the radial distance between the end portion 51a of the second tongue portion 51 on the partition plate 35 side and the turbine impeller 17 may be shorter than the radial distance between the end portion 43a of the first tongue portion 43 on the partition plate 35 side and the turbine impeller 17.

Figure 6:
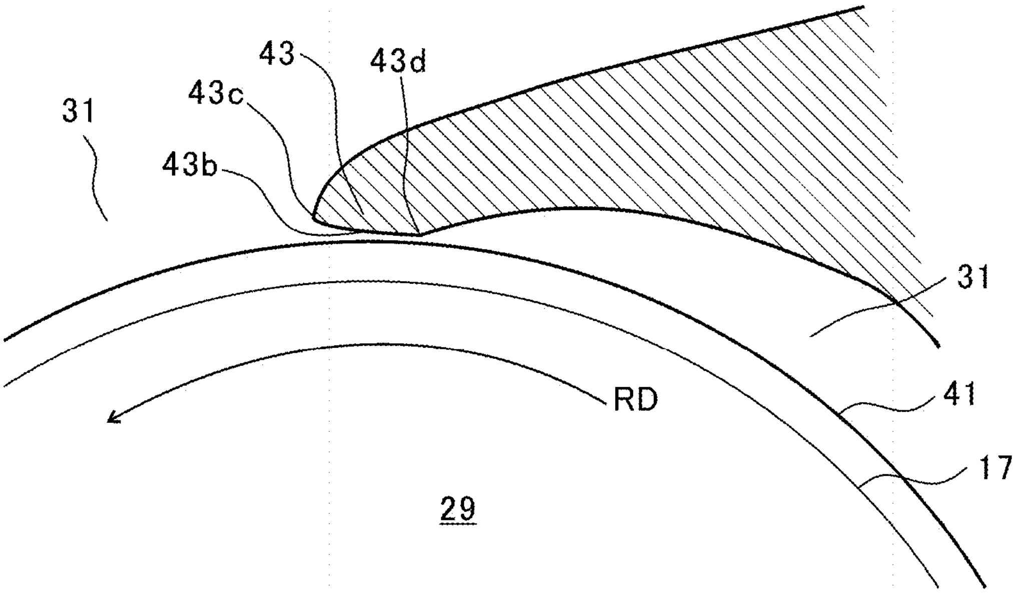
FIG. 6 is a sectional view for illustrating a shape of the tongue portion in a second modification example.

FIG. 6 is a sectional view for illustrating a shape of the tongue portion in a second modification example. FIG. 6 is a sectional view in a cross section that is perpendicular to the axial direction of the shaft 15 and passes through the first turbine scroll flow passage 31. In the second modification example, the shape of the first tongue portion 43 is different from that in the embodiment described above with reference to FIG. 1 to FIG. 4.

As illustrated in FIG. 6, in the second modification example, the radial distance between the first tongue portion 43 and the turbine impeller 17 becomes longer as extending in the rotation direction RD of the turbine impeller 17. In the example of FIG. 6, a radial position of an opposing surface 43b of the first tongue portion 43 that faces the turbine impeller 17 is shifted radially outward as the opposing surface 43b extends in the rotation direction RD. An end portion 43c of the opposing surface 43b on a side toward the rotation direction RD is located more on the radially outer side than an end portion 43d of the opposing surface 43b on a side opposite to the side toward the rotation direction RD. The opposing surface 43b is curved when viewed in the axial direction. However, the opposing surface 43b may be straight when viewed in the axial direction.

In the second modification example, as described above, the radial distance between the first tongue portion 43 and the turbine impeller 17 becomes longer as extending in the rotation direction RD of the turbine impeller 17. Accordingly, at the time when the blade body 17a of the turbine impeller 17 passes through the vicinity of the first tongue portion 43, it is possible to reduce the degree to which the gas flow is compressed by the blade body 17a and the first tongue portion 43. Thus, generation of a separation vortex in the vicinity of the first tongue portion 43 is suppressed, and hence the blade vibration of the turbine impeller 17 is reduced more effectively.

Description has been given above of the example in which the radial distance between the first tongue portion 43 and the turbine impeller 17 becomes longer as extending in the rotation direction RD of the turbine impeller 17. However, for both the first tongue portion 43 and the second tongue portion 51, the radial distance between the tongue portion and the turbine impeller 17 may become longer as extending in the rotation direction RD of the turbine impeller 17. For only one of the first tongue portion 43 and the second tongue portion 51, the radial distance between the tongue portion and the turbine impeller 17 may become longer as extending in the rotation direction RD of the turbine impeller 17. When the radial distance between at least one of the first tongue portion 43 or the second tongue portion 51 and the turbine impeller 17 becomes longer as extending in the rotation direction RD of the turbine impeller 17, the same effect as that in the above-mentioned example is achieved.

The radial distance between at least one of the first tongue portion 43 or the second tongue portion 51 and the turbine impeller 17 may be constant regardless of the circumferential position. The radial distance between at least one of the first tongue portion 43 or the second tongue portion 51 and the turbine impeller 17 may become shorter as extending in the rotation direction RD of the turbine impeller 17.

An embodiment of the present disclosure has been described above with reference to the attached drawings, but, needless to say, the present disclosure is not limited to the above-mentioned embodiment. It is apparent that those skilled in the art may arrive at various alternations and modifications within the scope of claims, and those examples are construed as naturally falling within the technical scope of the present disclosure.

Description has been given above of the example in which the turbine T is mounted to the turbocharger TC. However, the turbine T may be mounted to devices (for example, a power generator) other than the turbocharger TC.

The present disclosure accelerates both an improvement in aerodynamic performance and a reduction in blade vibration of turbine impellers. Thus, for example, the present disclosure can contribute to Goal 7 "Ensure access to affordable, reliable, sustainable and modern energy for all" and Goal 9 "Build resilient infrastructure, promote inclusive and sustainable industrialization and foster innovation" of the Sustainable Development Goals (SDGs).

The invention claimed is:

1. A turbine, comprising:

an accommodating portion configured to accommodate a turbine impeller;

a discharge flow passage that is continuous with the accommodating portion in an axial direction of the turbine impeller;

a first turbine scroll flow passage that extends around the turbine impeller on a radially outer side, and communicates with the accommodating portion;

a second turbine scroll flow passage that extends around the turbine impeller on the radially outer side, communicates with the accommodating portion, and is arranged on a discharge flow passage side with respect to the first turbine scroll flow passage;

a partition plate configured to divide the first turbine scroll flow passage and the second turbine scroll flow passage in the axial direction;

a first tongue portion that is provided at a position facing a downstream end of the first turbine scroll flow passage; and a second tongue portion that is provided at a position facing a downstream end of the second turbine scroll flow passage, a radial distance between an end portion of the second tongue portion on a partition plate side and the turbine impeller being different from a radial distance between an end portion of the first tongue portion on the partition plate side and the turbine impeller, wherein the radial distance between the end portion of the second tongue portion on the partition plate side and the turbine impeller is longer than the radial distance between the end portion of the first tongue portion on the partition plate side and the turbine impeller.

2. The turbine according to claim 1, wherein a radial distance between at least one of the first tongue portion or the second tongue portion and the turbine impeller becomes longer as extending toward the discharge flow passage side in the axial direction.

3. A turbocharger, comprising the turbine of claim 2.

4. The turbine according to claim 1, wherein a radial distance between at least one of the first tongue portion or the second tongue portion and the turbine impeller becomes longer as extending in a rotation direction of the turbine impeller.

5. A turbocharger, comprising the turbine of claim 4.

6. A turbocharger, comprising the turbine of claim 1.

7. A turbine, comprising:

an accommodating portion configured to accommodate a turbine impeller;

a discharge flow passage that is continuous with the accommodating portion in an axial direction of the turbine impeller;

a first turbine scroll flow passage that extends around the turbine impeller on a radially outer side, and communicates with the accommodating portion;

a second turbine scroll flow passage that extends around the turbine impeller on the radially outer side, communicates with the accommodating portion, and is arranged on a discharge flow passage side with respect to the first turbine scroll flow passage;

a partition plate configured to divide the first turbine scroll flow passage and the second turbine scroll flow passage in the axial direction;

a first tongue portion that is provided at a position facing a downstream end of the first turbine scroll flow passage; and a second tongue portion that is provided at a position facing a downstream end of the second turbine scroll flow passage, a radial distance between an end portion of the second tongue portion on a partition plate side and the turbine impeller being different from a radial distance between an end portion of the first tongue portion on the partition plate side and the turbine impeller, wherein an average value of a radial distance between the second tongue portion and the turbine impeller in the axial direction is larger than an average value of a radial distance between the first tongue portion and the turbine impeller in the axial direction.

8. The turbine according to claim 7, wherein a radial distance between at least one of the first tongue portion or the second tongue portion and the turbine impeller becomes longer as extending toward the discharge flow passage side in the axial direction.

9. A turbocharger, comprising the turbine of claim 8.

10. The turbine according to claim 7, wherein a radial distance between at least one of the first tongue portion or the second tongue portion and the turbine impeller becomes longer as extending in a rotation direction of the turbine impeller.

11. A turbocharger, comprising the turbine of claim 10.

12. A turbocharger, comprising the turbine of claim 7.

13. A turbine, comprising:

an accommodating portion configured to accommodate a turbine impeller;

a discharge flow passage that is continuous with the accommodating portion in an axial direction of the turbine impeller;

a first turbine scroll flow passage that extends around the turbine impeller on a radially outer side, and communicates with the accommodating portion;

a second turbine scroll flow passage that extends around the turbine impeller on the radially outer side, communicates with the accommodating portion, and is arranged on a discharge flow passage side with respect to the first turbine scroll flow passage;

a partition plate configured to divide the first turbine scroll flow passage and the second turbine scroll flow passage in the axial direction;

a first tongue portion that is provided at a position facing a downstream end of the first turbine scroll flow passage; and a second tongue portion that is provided at a position facing a downstream end of the second turbine scroll flow passage, a radial distance between an end portion of the second tongue portion on a partition plate side and the turbine impeller being different from a radial distance between an end portion of the first tongue portion on the partition plate side and the turbine impeller, wherein a radial distance between at least one of the first tongue portion or the second tongue portion and the turbine impeller becomes longer as extending toward the discharge flow passage side in the axial direction over an entire area in the axial direction.

14. A turbocharger, comprising the turbine of claim 13.

* * * * *